A spindle motor includes a stationary portion and a rotating portion. The stationary portion includes a shaft and the rotating portion includes a sleeve portion, a hub, a magnet, and a cap. The sleeve portion is arranged opposite to the shaft. The hub is made of metal, and includes a top plate portion extending radially outward from the sleeve portion, and an outer tubular portion extending downward from an outer edge of the top plate portion. The magnet is fixed to the outer tubular portion and is arranged opposite to the stator. The cap is made of metal, and includes an annular plate-shaped portion fixed to an upper surface of the top plate portion. The magnet has a coefficient of thermal expansion greater than that of the hub. The cap has a coefficient of thermal expansion greater than that of both the hub and the magnet.

12 Claims, 6 Drawing Sheets

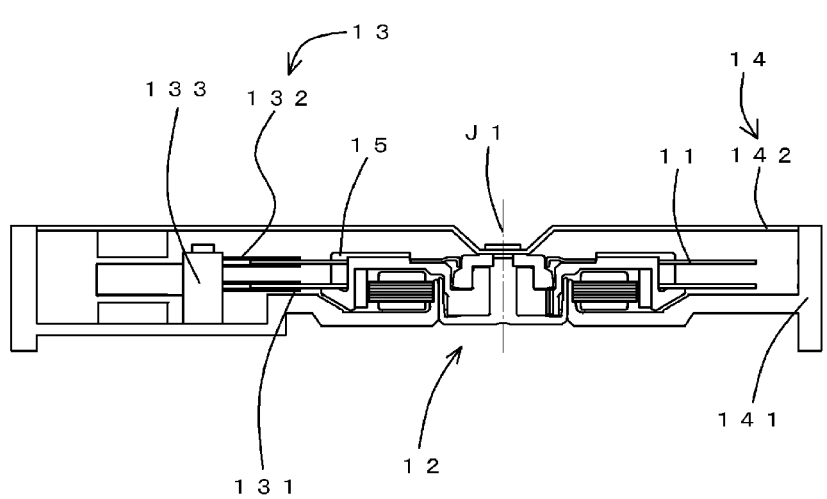

(56) References Cited

U.S. PATENT DOCUMENTS

| | | |
|---|---|---|
| 2013/0128379 A1 | 5/2013 | Mizukami et al. |
| 2013/0321951 A1 | 12/2013 | Sumiji et al. |
| 2014/0010065 A1 | 1/2014 | Kimura et al. |

OTHER PUBLICATIONS

Uchibori et al.; "Bearing Mechanism, Spindle Motor Including the Bearing Mechanism and Electronic Equipment Including the Spindle Motor"; U.S. Appl. No. 14/458,437, filed Aug. 13, 2014.

* cited by examiner

SPINDLE MOTOR AND DISK DRIVE APPARATUS

BACKGROUND OF THE INVENTION

1. Field of the Invention

The present invention relates to a spindle motor for use in a disk drive apparatus.

2. Description of the Related Art

Spindle motors arranged to rotate disks about central axes thereof are typically installed in electronic devices, such as hard disk apparatuses and optical disk apparatuses. Such spindle motors include a stationary portion fixed to a housing of the electronic device, and a rotating portion arranged to rotate while supporting the disk(s).

Some known motors used in disk drive apparatuses also include a bearing mechanism using fluid dynamic pressure. A spindle motor disclosed in JP-A 2009-136143 includes a fixed shaft, an annular bearing component, a rotor component, and an annular cover. The bearing component is arranged at an upper end portion of the fixed shaft. The bearing component is defined integrally with the fixed shaft. The rotor component is arranged outside the fixed shaft. The annular cover is arranged above the bearing component. A radially outer end portion of the annular cover is adhered to an upper end portion of the rotor component. An outer circumferential surface of the bearing component is arranged opposite to an inner circumferential surface of the upper end portion of the rotor component. A seal gap is defined between the outer circumferential surface of the bearing component and the inner circumferential surface of the upper end portion of the rotor component. The seal gap is covered with the annular cover.

As described in JP-A 2009-136143, in some motors, a cap member arranged to cover a capillary seal gap is arranged in a rotating portion. In such a motor, the annular cover is arranged to define a labyrinth seal together with an end portion of the shaft, and this reduces exchange of air and accompanying evaporation of a bearing fluid. For example, in a small-sized and high-performance electronic device, such as a notebook PC in which a disk drive apparatus is installed, a CPU and the like inside a case thereof generate a large amount of heat. If the heat generated in the CPU and the like is transmitted to the rotating portion of the motor, the heat may cause a deformation and a warping of the rotating portion. If this happens, the motor is unable to rotate stably. Accordingly, there is a demand for a motor structure with which a motor is unlikely to be deformed even when the motor is exposed to heat from a heat source, such as the CPU.

SUMMARY OF THE INVENTION

A spindle motor according to a preferred embodiment of the present invention includes a stationary portion including a stator, and a rotating portion rotatably supported by the stationary portion through a lubricating oil. The stationary portion includes a shaft arranged along a central axis extending in a vertical direction. The rotating portion includes a sleeve portion, a hub, a magnet, and a cap. The sleeve portion includes an inner circumferential surface arranged opposite to an outer circumferential surface of the shaft. The hub is made of metal, and includes a top plate portion extending radially outward from the sleeve portion, and an outer tubular portion extending downward from an outer edge of the top plate portion. The magnet is made of bonded neodymium, is fixed to the outer tubular portion, and is arranged opposite to the stator with a gap intervening therebetween. The cap is made of metal, and includes an annular plate-shaped portion fixed to an upper surface of the top plate portion. The magnet has a coefficient of thermal expansion that is greater than a coefficient of thermal expansion of the hub. The cap has a coefficient of thermal expansion greater than both the coefficients of thermal expansion of the hub and the magnet.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

It is assumed herein that a vertical direction is defined as a direction in which a central axis of a motor extends, and that an upper side and a lower side along the central axis of the motor are referred to simply as an upper side and a lower side, respectively.

It should be noted, however, that the above definitions of the vertical direction and the upper and lower sides should not be construed to restrict relative positions or directions of different members or portions when the motor is actually installed in a device. Also note that directions parallel to or substantially parallel to the central axis are referred to by the term "axial direction", "axial", or "axially", that directions perpendicular to or substantially perpendicular to the central axis are simply referred to by the term "radial direction", "radial", or "radially", and that a direction along or substantially along a circular arc centered on the central axis is simply referred to by the term "circumferential direction", "circumferential", or "circumferentially". Further, the term "perpendicular direction" includes both perpendicular and substantially perpendicular directions and the term "parallel direction" includes both parallel and substantially parallel directions.

Figure 1:
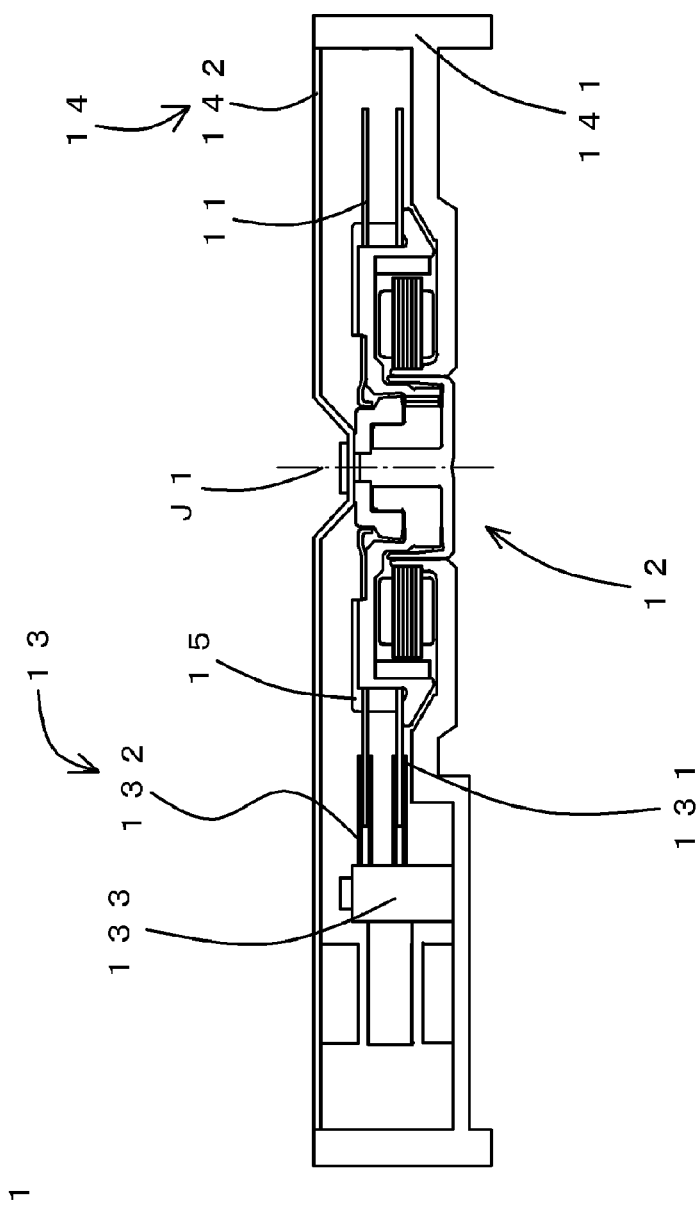
FIG. 1 is a schematic cross-sectional view of a disk drive apparatus according to a preferred embodiment of the present invention.

FIG. 1 is a cross-sectional view illustrating an internal structure of a disk drive apparatus 1 including a spindle motor 12 (hereinafter referred to simply as the "motor 12") according to a preferred embodiment of the present invention. The disk drive apparatus 1 preferably is a so-called hard disk drive. The disk drive apparatus 1 preferably includes, for example, two flat disks 11 on which information is recorded, the motor 12, an access portion 13, and a housing 14. The motor 12 is arranged to rotate while holding the disks 11. The access portion 13 is arranged to perform reading and writing of information from or to the disks 11. The access portion 13 may be arranged to perform at least one of the reading and the writing of information from or to the disks 11.

As illustrated in FIG. 1, the housing 14 preferably includes a cup-shaped or substantially cup-shaped lower housing member 141 and a plate-shaped upper plate member 142. The disks 11, the motor 12, and the access portion 13 are accommodated inside the lower housing member 141. The upper plate member 142 is fitted to the lower housing member 141 to define the housing 14. An interior space of the disk drive apparatus 1 is preferably a clean space with no, or only an extremely small amount of, dirt or dust. According to the present preferred embodiment, the interior space of the disk drive apparatus 1 is preferably filled with air. Note that the interior space of the disk drive apparatus 1 may be filled with a helium gas, a hydrogen gas, a nitrogen gas, etc. Also note that the interior space of the disk drive apparatus 1 may be filled with a mixture of any of these gases and air, if so desired.

The two disks 11 are preferably fixed to the motor 12 through a clamper 15. The clamper 15 is fixed to the motor 12 to support the disks 11. A spacer (not shown) is arranged between the two disks 11. The disks 11 are fixed to the motor 12 through the clamper 15 and the spacer.

Note that the two disks 11 are fixed while being spaced from each other in a direction along a central axis J1 of the motor 12. The access portion 13 preferably includes four heads 131, four arms 132, and a head actuator mechanism 133, for example. Each of the heads 131 is arranged in close proximity to a corresponding one of the disks 11 to perform the reading and the writing of information from or to the disk 11. Note that each head 131 may be arranged to perform at least one of the reading and the writing of information. Each arm 132 is arranged to support a separate one of the heads 131. The head actuator mechanism 133 is arranged to move each arm 132 to move an associated one of the heads 131 relative to the corresponding disk 11. The above mechanism enables each head 131 to make access to a desired location on the corresponding disk 11 with the head 131 being arranged in close proximity to the rotating disk 11. Note that the number of disks 11 is not limited to two, and may also be one or more than two.

Figure 2:
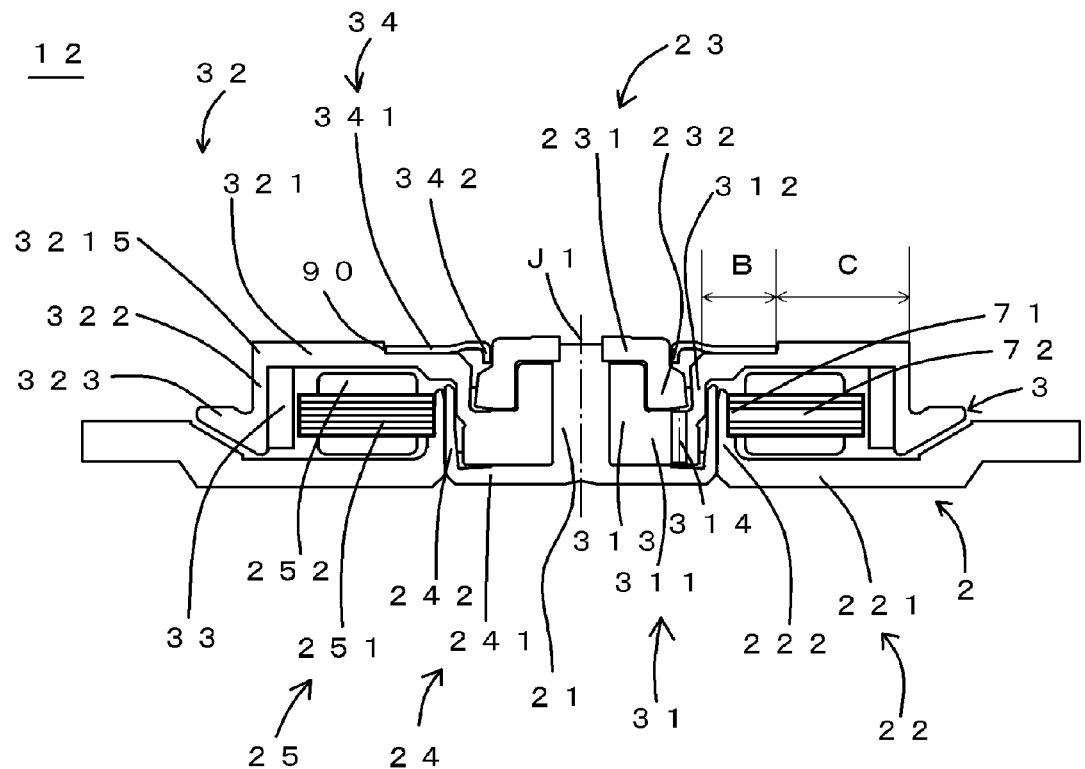
FIG. 2 is a schematic cross-sectional view of a spindle motor according to the above preferred embodiment of the present invention.

FIG. 2 is a cross-sectional view illustrating the motor 12 according to a preferred embodiment of the present invention.

The motor 12 is preferably an outer-rotor motor. The motor 12 includes a stationary portion 2 and a rotating portion 3. The rotating portion 3 is preferably rotatably supported by the stationary portion 2 through a lubricating oil (not shown).

The stationary portion 2 preferably includes a shaft 21, a base portion 22, a plate portion 23, a cup portion 24, and a stator 25.

The shaft 21 is columnar or substantially columnar, and is arranged to extend along the central axis J1 extending in the vertical direction. The plate portion 23 is fixed to the shaft 21 in the vicinity of an upper end portion thereof. In addition, the cup portion 24 is arranged in the vicinity of a lower end portion of the shaft 21. The shaft 21 is preferably, for example, made of a metal, such as stainless steel, steel, iron, etc.

In addition, the upper end portion of the shaft 21 is fixed to the upper plate member 142 of the disk drive apparatus 1 (see FIG. 1). The lower end portion of the shaft 21 is fixed to the base portion 22 through the cup portion 24.

The base portion 22 includes a hole portion (not labeled) defined at a center thereof. The base portion 22 preferably includes a plate portion 221 arranged to extend radially, and a cylindrical or substantially cylindrical holder portion 222 arranged to project upward from an inner edge of the plate portion 221. The base portion 22 is arranged to define at least a portion of the lower housing member 141. Note that the base portion 22 and the lower housing member 141 may be defined by a single continuous monolithic member as illustrated in FIG. 1. Also note that the base portion 22 and the lower housing member 141 may alternatively be defined by separate members. The base portion 22 is defined, for example, by subjecting a metal, such as an aluminum alloy, to casting, press working, or the like.

The plate portion 23 is an annular or substantially annular member fixed to an outer circumferential surface of the shaft 21. The plate portion 23 is arranged to surround the shaft 21 above a flat plate portion 241 of the cup portion 24. The plate portion 23 is press fitted to the shaft 21 in the vicinity of the upper end portion of the shaft 21, and is fixed to the shaft 21 through an adhesive 90. Note, however, that the shaft 21 and the plate portion 23 may alternatively be defined by a single continuous monolithic member.

The plate portion 23 according to the present preferred embodiment preferably includes a circular plate portion 231 and an annular projecting portion 232. The circular plate portion 231 is fixed to the outer circumferential surface of the shaft 21, and is arranged to extend radially outward from the shaft 21. In more detail, the circular plate portion 231 includes a hole or a through hole. According to the present preferred embodiment, the circular plate portion 231 includes the through hole, and a top portion of the shaft 21 is accommodated and fixed in the through hole. In addition, the circular plate portion 231 is arranged to extend radially outward from the top portion of the shaft 21. The annular projecting portion 232 is arranged to extend downward from an outer edge of the circular plate portion 231. The annular projecting portion 232 is cylindrical or substantially cylindrical. Note that, although the shaft 21 and the circular plate portion 231 are defined by separate members according to the present preferred embodiment, the circular plate portion 231 and the shaft 21 may alternatively be defined by a single continuous monolithic member. The plate portion 23 is arranged to have a cup-shaped or substantially cup-shaped vertical sectional cross area with the circular plate portion 231 and the annular projecting portion 232. The plate portion 23 is defined, for example, by subjecting a metal including copper as a main component to a cutting process, or by an injection molding process using a resin.

The cup portion 24 is an annular portion arranged in the vicinity of the lower end portion of the shaft 21. According to the present preferred embodiment, the shaft 21 and the cup portion 24 are preferably defined by a single continuous monolithic member. Note, however, that the shaft 21 and the cup portion 24 may alternatively be defined by separate members. The cup portion 24 preferably includes the flat plate portion 241, which is arranged to extend radially outward from the shaft 21, and a cylindrical portion 242 arranged to extend upward from an outer edge of the flat plate portion 241. The cup portion 24 is arranged to have a cup-shaped or substantially cup-shaped vertical sectional cross area with the flat plate portion 241 and the cylindrical portion 242. The cup portion 24 is defined, for example, by subjecting a metal including copper as a main component to a cutting process, or by an injection molding process using a resin.

The stator 25 is fitted to the base portion 22. The stator 25 is arranged to produce a turning force (a torque) centered on the central axis J1 between the stator 25 and a magnet 33 arranged around the shaft 21. That is, the stator 25 and the magnet 33 together define a driving mechanism configured to rotate the rotating portion 3 with respect to the stationary portion 2.

The stator 25 preferably includes a stator core 251 and a plurality of coils 252. The stator core 251 includes an annular core back 71 and a plurality of teeth 72. The core back 71 is fixed to an outer circumferential surface of the holder portion 222 of the base portion 22. The teeth 72 are arranged to project radially outward from the core back 71. The stator core 251 is preferably defined, for example, by laminated steel sheets, that is, electromagnetic steel sheets placed one upon another in an axial direction. Each coil 252 is defined by a conducting wire wound around a separate one of the teeth 72.

The rotating portion 3 preferably includes a sleeve portion 31, a hub 32, the magnet 33, and a cap 34.

The sleeve portion 31 is cylindrical or substantially cylindrical in shape, and includes an inner circumferential surface arranged opposite to the outer circumferential surface of the shaft 21. In other words, the sleeve portion 31 is arranged to accommodate the shaft 21. The sleeve portion 31 is arranged to rotate about the central axis J1 around the shaft 21. The sleeve portion 31 includes an annular portion 311, an outer cylindrical portion 312, an inner cylindrical portion 313, and a communicating hole 314. The annular portion 311 is cylindrical or substantially cylindrical in shape. The annular portion 311 includes the communicating hole 314, which is arranged to extend in the axial direction from an upper surface to a lower surface of the annular portion 311 to pass through the annular portion 311. The outer cylindrical portion 312 is a cylindrical or substantially cylindrical portion arranged to extend upward from an outer edge of the annular portion 311. Meanwhile, the inner cylindrical portion 313 is a cylindrical or substantially cylindrical portion arranged to extend upward from an inner edge of the annular portion 311. An inner circumferential surface of the annular portion 311 and an inner circumferential surface of the inner cylindrical portion 313 together define a single continuous surface in the inner circumferential surface of the sleeve portion 31. The inner circumferential surface of the sleeve portion 31 and the outer circumferential surface of the shaft 21 are arranged radially opposite each other with a slight gap intervening therebetween. Metal, such as a ferromagnetic stainless steel, for example, is preferably used as a material of the sleeve portion 31.

The hub 32 preferably includes a top plate portion 321, a tubular portion 322, and a flange portion 323. The top plate portion 321 is a disk-shaped or substantially disk-shaped portion arranged to extend radially outward from an upper end of the outer cylindrical portion 312 of the sleeve portion 31. The tubular portion 322 is a cylindrical or substantially cylindrical portion arranged to extend downward from an outer edge of the top plate portion 321. Meanwhile, the flange portion 323 is a projecting portion arranged to extend radially outward from a lower end of the tubular portion 322. Metal, such as a ferromagnetic stainless steel, for example, is preferably used as a material of the hub 32. Preferably, a ferritic stainless steel is used. In addition, the hub 32 preferably has a coefficient of thermal expansion of about $10.0 \times 10^{-6}/°$ C., for example.

According to the present preferred embodiment, the sleeve portion 31 and the hub 32 are preferably defined by a single continuous monolithic member. Note, however, that the sleeve portion 31 and the hub 32 may be defined by separate members, if so desired.

The magnet 33 is fixed to an inner circumferential surface of the tubular portion 322 of the hub 32. The magnet 33 is annular in shape, and is centered on the central axis J1. The magnet 33 is arranged opposite to the stator 25 with a gap intervening therebetween. According to the present preferred embodiment, an inner circumferential surface of the magnet 33 is arranged radially opposite an outer circumferential surface of each of the teeth 72 of the stator core 251. In addition, the inner circumferential surface of the magnet 33 is a pole surface in which north and south poles are alternately arranged. A neodymium bonded magnet (Nd—Fe—B BOND MAGNET), for example, is preferably used as the magnet 33. In addition, the magnet 33 preferably has a coefficient of thermal expansion of about $12.4 \times 10^{-6}/°$ C., for example.

The cap 34 is an annular member fixed to an upper surface of the top plate portion 321 of the hub 32. The cap 34 is positioned above an upper capillary seal portion 51, which will be described below. The cap 34 is preferably obtained, for example, by subjecting a metal to a cutting process. Note, however, that the cap 34 may be obtained by another method, such as press working, for example. Also note that the cap 34 may be a resin-molded article, if so desired.

The cap 34 according to the present preferred embodiment preferably includes a plate-shaped portion 341 and a projecting portion 342. The plate-shaped portion 341 is annular or substantially annular, and is arranged to extend radially. The projecting portion 342 is arranged to project downward from an inner edge of the plate-shaped portion 341. An inner circumferential surface of the projecting portion 342 is arranged radially opposite an outer circumferential surface of the plate portion 23 with a slight gap intervening therebetween. Note that the cap 34 may alternatively be made up of only the plate-shaped portion 341 without including the projecting portion 342.

Figure 4:
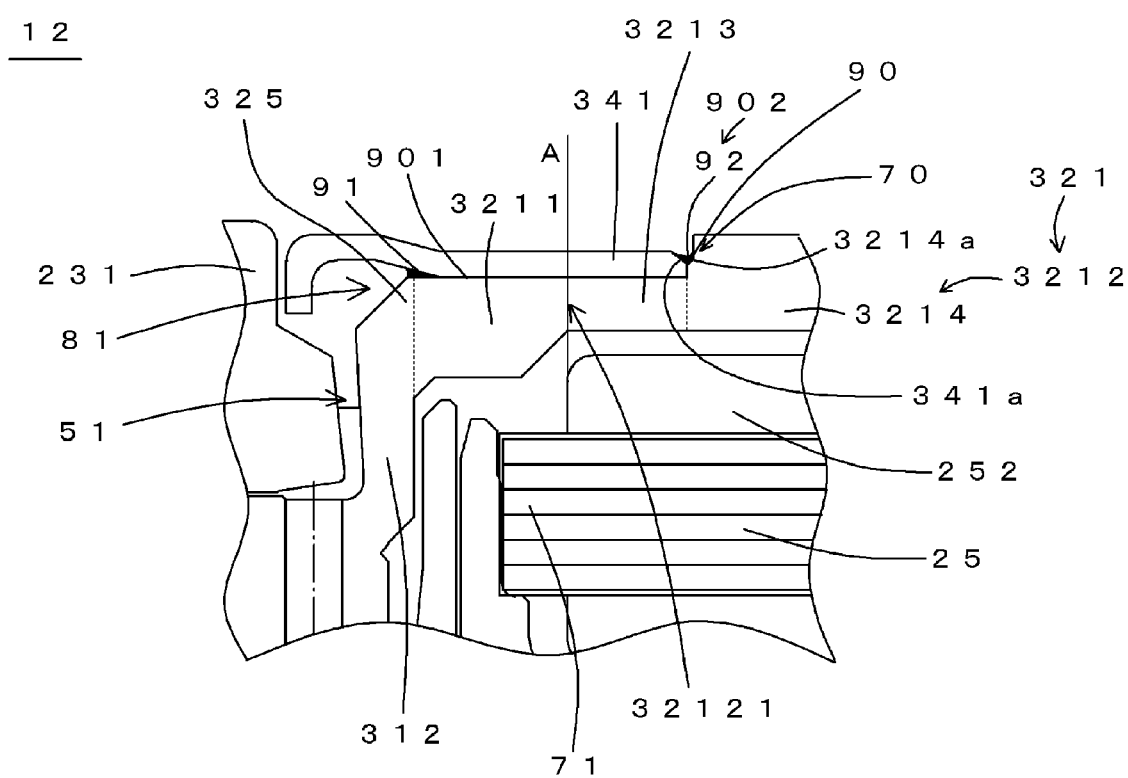
FIG. 4 is a schematic cross-sectional view illustrating a plate portion according to the above preferred embodiment of the present invention and its vicinity.

A first adhesion region 901 and a second adhesion region 902 over which the adhesive 90 is arranged are preferably defined between the plate-shaped portion 341 and the top plate portion 321, as shown in FIG. 4. The first adhesion region 901 is arranged between a lower surface of the plate-shaped portion 341 and the upper surface of the top plate portion 321. An inside liquid surface 91 of the adhesive 90 is defined at a radially inner end of the first adhesion region 901. According to the present preferred embodiment, the inside liquid surface 91 is preferably arranged above an upper surface of the outer cylindrical portion 312. Note, however, that the inside liquid surface 91 may be arranged not above the upper surface of the outer cylindrical portion 312 but above the upper surface of the top plate portion 321.

The second adhesion region 902, which includes an outside liquid surface 92 of the adhesive 90, is preferably defined radially outside the first adhesion region 901. The second adhesion region 902 is arranged between an outer circumferential surface of the plate-shaped portion 341 and an outer decreased thickness portion 3214, which will be described below. The outer circumferential surface of the plate-shaped portion 341 is opposed to an inner circumferential surface of the outer decreased thickness portion 3214 with the second adhesion region 902 intervening therebetween.

Metal, such as a ferromagnetic stainless steel, for example, is preferably used as a material of the cap 34. Preferably, an austenitic stainless steel is used. In addition, the cap 34 preferably has a coefficient of thermal expansion of about $17.3 \times 10^{-6}/°$ C., for example.

Figure 3:
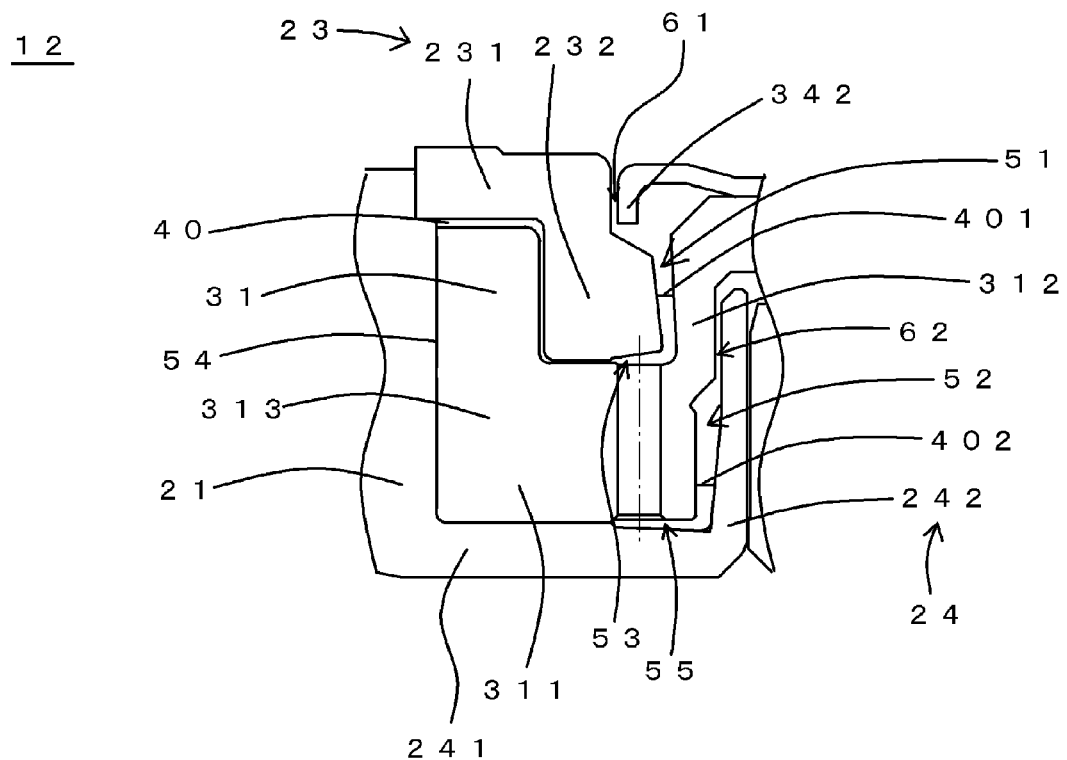
FIG. 3 is a schematic cross-sectional view illustrating a sleeve portion according to the above preferred embodiment of the present invention and its vicinity.

FIG. 3 is a schematic cross-sectional view illustrating the sleeve portion 31 and its vicinity. As illustrated in FIG. 3, the lubricating oil 40 is arranged in a minute gap between the sleeve portion 31 and a combination of the shaft 21, the plate portion 23, and the cup portion 24. Examples of the lubricating oil 40 include, for example, a polyolester oil, a diester oil, and other types of oil having ester as its main ingredient.

The upper capillary seal portion 51 is defined by an outer circumferential surface of the annular projecting portion 232 and an inner circumferential surface of the outer cylindrical portion 312 of the sleeve portion 31. That is, the outer circumferential surface of the annular projecting portion 232 is preferably arranged radially opposite the inner circumferential surface of the outer cylindrical portion 312 with the upper capillary seal portion 51 intervening therebetween. In addition, the upper capillary seal portion 51 is arranged to decrease in radial width with decreasing height.

A lower capillary seal portion 52 is defined by an outer circumferential surface of the annular portion 311 and an inner circumferential surface of the cylindrical portion 242. That is, the outer circumferential surface of the annular portion 311 is arranged opposite to the inner circumferential surface of the cylindrical portion 242 with the lower capillary seal portion 52 intervening therebetween. In addition, the lower capillary seal portion 52 is arranged to decrease in radial width with decreasing height.

A lower surface of the annular projecting portion 232 is arranged axially opposite the upper surface of the annular portion 311 with a first gap 53 intervening therebetween. An upper thrust dynamic pressure groove array (not shown) is defined in the lower surface of the annular projecting portion 232 or the upper surface of the annular portion 311 inside the first gap 53. The upper thrust dynamic pressure groove array is preferably, for example, a groove array arranged in a spiral pattern or a groove array arranged in a herringbone pattern. While the motor 12 is running, the upper thrust dynamic pressure groove array induces a dynamic pressure in the lubricating oil 40, so that an upper thrust dynamic pressure bearing portion is defined in the first gap 53.

An upper surface of the flat plate portion 241 is arranged axially opposite the lower surface of the annular portion 311 with a third gap 55 intervening therebetween. A lower thrust dynamic pressure groove array (not shown) is preferably defined in the upper surface of the flat plate portion 241 or the lower surface of the annular portion 311 radially inside the communicating hole 314. The lower thrust dynamic pressure groove array is preferably, for example, a groove array arranged in a spiral pattern or a groove array arranged in a herringbone pattern. While the motor 12 is running, the lower thrust dynamic pressure groove array induces a dynamic pressure in the lubricating oil 40, so that a lower thrust dynamic pressure bearing portion is defined in the third gap 55. The rotating portion 3 is arranged to rotate while being axially supported by the upper thrust dynamic pressure bearing portion and the lower thrust dynamic pressure bearing portion.

In addition, the inner circumferential surface of the sleeve portion 31 is arranged opposite to the outer circumferential surface of the shaft 21 with a second gap 54 intervening therebetween. A radial dynamic pressure groove array (not shown) is preferably defined in the inner circumferential surface of the sleeve portion 31 or the outer circumferential surface of the shaft 21 in the second gap 54. The radial dynamic pressure groove array is preferably, for example, a groove array arranged in a herringbone pattern. While the motor 12 is running, the radial dynamic pressure groove array induces a dynamic pressure in the lubricating oil 40, so that a radial dynamic pressure bearing portion is defined in the second gap 54. The rotating portion 3 is arranged to rotate while being radially supported by the radial dynamic pressure bearing portion. Note that the number of such radial dynamic pressure bearing portions defined in the second gap 54 may be either one or more than one.

When the motor 12 is stationary, an upper liquid surface 401 of the lubricating oil 40 is preferably positioned in the upper capillary seal portion 51. In addition, when the motor 12 is stationary, a lower liquid surface 402 of the lubricating oil 40 is preferably positioned in the lower capillary seal portion 52. As described above, each of the upper capillary seal portion 51 and the lower capillary seal portion 52 is arranged to decrease in radial width with decreasing height. Each of the upper liquid surface 401 and the lower liquid surface 402 of the lubricating oil 40 thus defines a meniscus by surface tension. As a result, the likelihood that the lubricating oil 40 will leak through the upper liquid surface 401 or the lower liquid surface 402 is significantly reduced.

An outer circumferential portion of the first gap 53 preferably includes a portion arranged to increase in axial width with increasing distance from the central axis J1. Similarly, an outer circumferential portion of the third gap 55 preferably includes a portion arranged to increase in axial width with increasing distance from the central axis J1. Thus, in the case where air bubbles are generated in the lubricating oil 40 in the first gap 53 and the third gap 55, the air bubbles tend to be easily carried toward the upper capillary seal portion 51 and the lower capillary seal portion 52, respectively. This contributes to reducing the likelihood that any air bubble will stay in the first gap 53 or the third gap 55, and to improving efficiency in discharge of the air bubbles.

An upper labyrinth seal portion 61 is defined by an outer circumferential surface of the circular plate portion 231 and the inner circumferential surface of the projecting portion 342. As mentioned above, the outer circumferential surface of the circular plate portion 231 and the inner circumferential surface of the projecting portion 342 are arranged radially opposite each other with the slight gap intervening therebetween. Thus, entrance and exit of a gas through this gap are limited. This contributes to reducing evaporation of the lubricating oil 40 through the upper liquid surface 401.

A lower labyrinth seal portion 62 is preferably defined by an outer circumferential surface of the outer cylindrical portion 312 of the sleeve portion 31 and the inner circumferential surface of the cylindrical portion 242 of the cup portion 24. The outer cylindrical portion 312 and the cylindrical portion 242 are arranged radially opposite each other with a slight gap intervening therebetween. Thus, entrance and exit of a gas through this gap are limited. This contributes to reducing evaporation of the lubricating oil 40 through the lower liquid surface 402.

FIG. 4 is a schematic cross-sectional view illustrating the plate portion 23 and its vicinity. The present preferred embodiment will now be described below with reference to FIGS. 2 and 4. According to the present preferred embodiment, as described above, the coefficient of thermal expansion of the magnet 33 (not shown) is greater than the coefficient of thermal expansion of the hub 32. Moreover, the coefficient of thermal expansion of the cap 34 is greater than both the coefficients of thermal expansion of the hub 32 and the magnet 33.

The top plate portion 321 preferably includes an increased thickness portion 3211 and a decreased thickness portion 3212. The increased thickness portion 3211 is in the shape of a disk, and is arranged to extend radially outward from an outer end of the outer cylindrical portion 312. At least a portion of the increased thickness portion 3211 is axially opposed to both the cylindrical portion 242 and the holder portion 222. The decreased thickness portion 3212 is in the shape of a disk, and is arranged to extend radially outward from an outer end of the increased thickness portion 3211. The decreased thickness portion 3212 of the top plate portion 321 is positioned in a region outside an imaginary line "A" extending in the axial direction from an inner end of each of the coils 252.

In the case where a heat is applied to the motor 12 from a heat source, such as, for example, a CPU, the hub 32, the magnet 33, the cap 34, and so on expand and are deformed because of the heat. Since the coefficient of thermal expansion of the magnet 33 is greater than the coefficient of thermal expansion of the hub 32, the degree of axial expansion of the magnet 33 caused by changes in temperature is greater than the degree of axial expansion of the hub 32. Thus, a force occurs which pushes an outer end portion 3215 of the top plate portion 321 axially upward with an inner end portion of the decreased thickness portion 3212 of the hub 32 as a center. This results in a deterioration in the degree of horizontality of an upper surface of the hub 32, with the potential result that the motor 12 becomes unable to rotate stably. In addition, the degree or radial expansion of the magnet 33 caused by changes in temperature is greater than the degree or radial expansion of the hub 32. Thus, a force which pushes a lower end portion of the tubular portion 322 radially outward with a corner portion 325 of the hub 32 as a center occurs. This force results in a deterioration in the degree of perpendicularity of an outer circumferential surface of the tubular portion 322. The deterioration in the degree of perpendicularity of the outer circumferential surface of the tubular portion 322 increases wobbling of each of the disks 11 fixed to the outer circumferential surface of the tubular portion 322 when the disks 11 are rotating, leading to a possibility of an error in reading and writing of information from or to the disks 11.

The expansion of the cap 34 can be made greater than the expansion of each of the hub 32 and the magnet 33 by selecting the coefficient of thermal expansion of the cap 34 to be greater than both the coefficients of thermal expansion of the hub 32 and the magnet 33. Once a sheet defined by two types of sheets having different coefficients of thermal expansion joined together is heated and experiences an increase in temperature, the overall sheet bends in a direction toward the sheet having the smaller coefficient of thermal expansion. This phenomenon is called a bimetallic effect. Because of this bimetallic effect, the cap 34 reduces a deformation of the hub 32 even in the case where the heat is applied to the motor 12 from the heat source, such as, for example, the CPU, and the hub 32 is deformed. Thus, radial and axial deformations of the hub 32 are reduced, enabling the motor 12 to rotate stably.

The decreased thickness portion 3212 includes an inner decreased thickness portion 3213 and the outer decreased thickness portion 3214. An upper surface of the inner decreased thickness portion 3213 is fixed to the lower surface of the plate-shaped portion 341 through the adhesive 90. The outer decreased thickness portion 3214 is arranged radially outward of the inner decreased thickness portion 3213. The inner decreased thickness portion 3213 is arranged to have an axial dimension smaller than that of the outer decreased thickness portion 3214. According to the present preferred embodiment, the inner decreased thickness portion 3213 preferably has a radial dimension smaller than that of the outer decreased thickness portion 3214. Note, however, that the inner decreased thickness portion 3213 may have a radial dimension greater than that of the outer decreased thickness portion 3214. In this case, an area over which the upper surface of the top plate portion 321 is covered with the plate-shaped portion 341 is increased, which increases an influence of the bimetallic effect. Accordingly, the deformations of the hub 32 and the cap 34 are preferably further reduced, enabling the motor 12 to rotate stably.

At least a portion of the plate-shaped portion 341 is arranged to axially overlap with the core back 71. More preferably, at least a portion of the plate-shaped portion 341 of the cap 34 is arranged to axially overlap with the coils 252. When the hub 32 is deformed because of the heat, stress is concentrated on the inner decreased thickness portion 3213, which has the smallest thickness, and the inner decreased thickness portion 3213 is deformed to the greatest extent such that horizontality of the hub 32 is easily affected thereat. When at least a portion of the plate-shaped portion 341 of the cap 34 is arranged to axially overlap with the coils 252, an area over which the plate-shaped portion 341 of the cap 34 and the top plate portion 321 are adhered to each other is increased. This contributes to reducing the radial dimension of the decreased thickness portion 3212, where the stress concentrates most easily, and to further reducing the deformation of the hub 32. In addition, the likelihood that the lubricating oil 40 in the upper capillary seal portion 51 will leak out of the motor 12 through a gap between the hub 32 and the cap 34 is reduced.

The lower surface of the plate-shaped portion 341 is fixed to the upper surface of the top plate portion 321 through the adhesive 90. Since the adhesive 90 is arranged between the lower surface of the plate-shaped portion 341 and the upper surface of the top plate portion 321, the hub 32 and the cap 34 are deformed as one single unitary body without being separated from each other, even when the hub 32 and the cap 34 are deformed because of the heat. Accordingly, the bimetallic effect can be obtained such that the radial and axial deformations of the hub 32 can be reduced. Note, however, that the plate-shaped portion 341 and the top plate portion 321 may not necessarily be fixed to each other through the adhesive 90, but the plate-shaped portion 341 may alternatively be fixed to the top plate portion 321 through press fitting. Also note that both press fitting and the adhesive 90 may be used in combination, if so desired. Also note that the plate-shaped portion 341 may be fixed to the top plate portion 321 by another method, such as, for example, welding or crimping.

The inside liquid surface 91 of the adhesive 90 is preferably defined at the radially inner end of the first adhesion region 901. A second tapered gap 81 preferably is defined between an upper surface of the increased thickness portion 3211 and the lower surface of the plate-shaped portion 341. The lower surface of the plate-shaped portion 341 preferably includes a cap inclined surface (not shown) arranged to obliquely extend radially inward and axially upward from an inner end of a region over which the plate-shaped portion 341 and the increased thickness portion 3211 are in contact with each other. The second tapered gap 81 is defined by the upper surface of the increased thickness portion 3211 of the top plate portion 321 and the cap inclined surface of the plate-shaped portion 341. The second tapered gap 81 is arranged to decrease in axial width with increasing distance from the central axis J1. The inside liquid surface 91 of the adhesive 90 is preferably positioned in the second tapered gap 81. Note that, according to a preferred embodiment of the present invention, the inside liquid surface 91 is preferably arranged radially outward of the annular portion 311 and radially inward of the stator 25. A strength with which the cap 34 and the hub 32 are adhered to each other is preferably improved by the inside liquid surface 91 of the adhesive 90 being defined between the plate-shaped portion 341 and the outer cylindrical portion 312. The hub 32 and the cap 34 are preferably deformed as one single unitary body without being separated from each other when the hub 32 and the cap 34 are deformed because of the heat. Accordingly, the bimetallic effect is obtained, and the radial and axial deformations of the hub 32 are significantly reduced or prevented.

The second adhesion region 902 includes the outside liquid surface 92 of the adhesive 90. An outer circumferential edge of the plate-shaped portion 341 preferably includes an upper inclined surface 341a arranged to extend radially outward and downward from a radially outer end of an upper surface of the plate-shaped portion 341. The inner circumferential surface of the outer decreased thickness portion 3214 of the decreased thickness portion 3212, which is radially opposed to an outermost circumferential surface of the cap 34, includes an upper inclined surface 3214a extending radially outward and upward at least in a region radially opposed to the upper inclined surface 341a. A first tapered gap 70 is defined by the upper inclined surface 341a and the upper inclined surface 3214a. The first tapered gap 70 is arranged to decrease in radial width with decreasing height. The outside liquid surface 92 of the adhesive 90 is preferably positioned in the first tapered gap 70. The adhesive 90 is held in the first tapered gap 70 by surface tension. Note that at least one of the upper inclined surface 341a and the upper inclined surface 3214a may be a curved surface, and that both the upper inclined surface 341a and the upper inclined surface 3214a may be curved surfaces. Also note that it is enough that at least one of the outer circumferential surface of the plate-shaped portion 341 and the inner circumferential surface of the outer decreased thickness portion 3214 should be inclined with respect to the central axis J1. The strength with which the cap 34 and the hub 32 are adhered to each other is improved by the outside liquid surface 92 of the adhesive 90 being defined in the second adhesion region 902. That is, the hub 32 and the cap 34 are deformed as one single unitary body without being separated from each other, even when the hub 32 and the cap 34 are deformed because of the heat. Accordingly, the bimetallic effect is obtained, and the radial and axial deformations of the hub 32 are significantly reduced or prevented.

Referring to FIG. 2, the radial dimension "B" of the first adhesion region 901 is preferably smaller than a distance "C" from a radially outer end of the first adhesion region 902 to a radially outer end of the upper surface of the hub 32. As described above, when the disks 11 are fixed to the motor 12, the hub 32 and the disks 11 are preferably fixed by the clamper 15. As a result of the clamper 15 being fixed to the hub 32 from above, the top plate portion 321 is pressed axially downward. This contributes to preventing an axial deformation of the outer end portion 3215 of the top plate portion 321 due to an influence of the heat. That is, according to the present preferred embodiment, an area of contact between a lower surface of the clamper 15 and the upper surface of the top plate portion 321 is increased in order to reduce the deformation of the hub 32. Further, a sufficient radial dimension of the first adhesion region 901 is secured to reduce the deformation of the hub 32 through the bimetallic effect, and to enable the motor 12 to rotate stably. Thus, the deformation of the hub 32 is further reduced by arranging the radial dimension "B" of the first adhesion region 901 to be smaller than the distance "C" from the radially outer end of the first adhesion region 901 to the radially outer end of the upper surface of the hub 32, and the motor 12 is able to rotate stably.

An uppermost surface of a portion of the plate-shaped portion 341, the portion extending over the first adhesion region 901, is arranged at an axial level lower than an axial level of an uppermost surface of the top plate portion 321. When the outside liquid surface 92 of the adhesive 90 is defined, the adhesive 90 is preferably applied from an axially upper side. At this time, if the adhesive 90 should overflow onto an upper surface of the outer decreased thickness portion 3214 across the inner circumferential surface of the outer decreased thickness portion 3214, the clamper 15 mentioned above could not be fixed to the upper surface of the outer decreased thickness portion 3214 in parallel therewith. Accordingly, the uppermost surface of the portion of the plate-shaped portion 341, the portion extending over the first adhesion region 901, is arranged at an axial level lower than that of the uppermost surface of the top plate portion 321, so that the outside liquid surface 92 of the adhesive 90 is prevented from being defined above the upper surface of the outer decreased thickness portion 3214.

Since the inside liquid surface 91 of the adhesive 90 is positioned between the lower surface of the plate-shaped portion 341 and the upper surface of the increased thickness portion 3211, the lubricating oil 40 is preferably prevented from leaking out of the motor 12 through the gap between the hub 32 and the cap 34. Further, the outside liquid surface 92 prevents the lubricating oil 40 from leaking out of the motor 12 through a gap between the plate-shaped portion 341 and the top plate portion 321. Note that another sealant may alternatively be used in place of the adhesive 90. For example, a resin material other than the adhesive may be used as the sealant.

Figure 5:
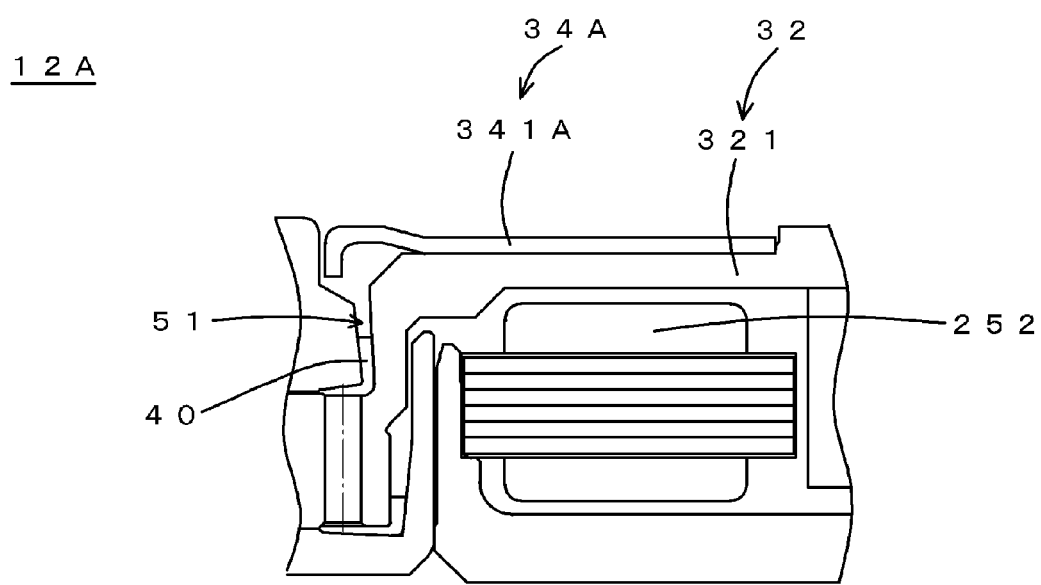
FIG. 5 is a cross-sectional view illustrating an example modification of the above preferred embodiment of the present invention.

FIG. 5 is a schematic cross-sectional view illustrating a cap 34A and its vicinity according to an example modification of the above-described preferred embodiment. A basic structure of a motor 12A according to this example modification is preferably similar to that of the motor 12 according to the above-described preferred embodiment.

According to this example modification, a radially outer end portion of a plate-shaped portion 341A of the cap 34A is preferably arranged radially outward of radially outer end portions of a plurality of coils 252. This results in an increase in an area over which a top plate portion 321 of a hub 32 and the cap 34A are adhered to each other. This contributes to more securely fixing the cap 34A to the hub 32. In addition, the likelihood that a lubricating oil 40 in an upper capillary seal portion 51 will leak out of the motor 12A through a gap between the hub 32 and the cap 34A is significantly reduced.

Figure 6:
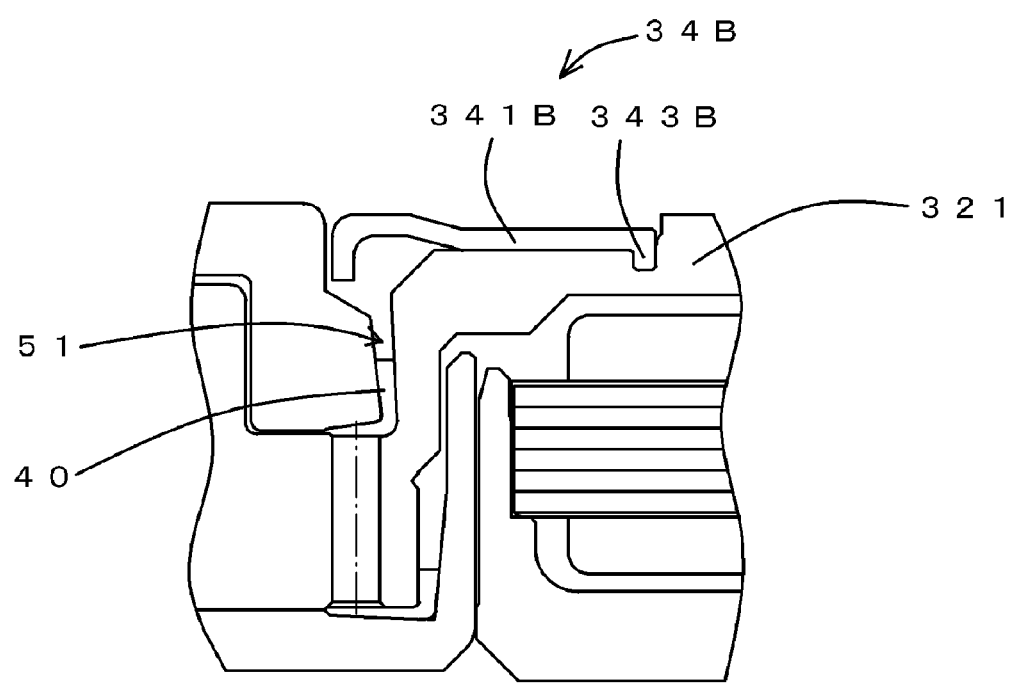
FIG. 6 is a cross-sectional view illustrating another example modification of the above preferred embodiment of the present invention.

FIG. 6 is a cross-sectional view illustrating another example modification of the above-described preferred embodiment. A basic structure of a motor 12B according to this example modification is preferably similar to that of the motor 12 according to the above-described preferred embodiment.

According to this example modification, a cap 34B preferably includes a "plate-shaped portion projecting portion" 343B arranged to project downward from a radially outer edge of a plate-shaped portion 341B. An outer circumferential surface of the plate-shaped portion projecting portion 343B is fitted and thus fixed to an inner circumferential surface of an outer decreased thickness portion 3214 of a top plate portion 321. Inclusion of the plate-shaped portion projecting portion 343B in the cap 34B results in an additional increase in an area over which a hub 32 and the cap 34B are adhered to each other. This contributes to more securely fixing the cap 34B to the hub 32. In addition, the likelihood that a lubricating oil 40 in an upper capillary seal portion 51 will leak out of the motor 12B through a gap between the hub 32 and the cap 34B is significantly reduced.

While preferred embodiments of the present invention and modifications thereof have been described above, it will be understood that the present invention is not limited to the above-described preferred embodiments.

Note that, only at least one of the upper and lower thrust dynamic pressure bearing portions may be defined without any radial dynamic pressure bearing portion being defined.

Note that spindle motors according to preferred embodiments of the present invention and modifications thereof may be either of a rotating-shaft type or of a fixed-shaft type. Also note that spindle motors according to preferred embodiments of the present invention and modifications thereof may be either of an outer-rotor type or of an inner-rotor type.

Also note that spindle motors according to preferred embodiments of the present invention and modifications thereof may be used not only in disk drive apparatuses but also in a variety of other electronic devices, such as, for example, fans.

Features of the above-described preferred embodiments and the modifications thereof may be combined appropriately as long as no conflict arises.

While preferred embodiments of the present invention and modifications thereof have been described above, it is to be understood that variations and additional modifications will be apparent to those skilled in the art without departing from the scope and spirit of the present invention. The scope of the present invention, therefore, is to be determined solely by the following claims.

What is claimed is:

1. A spindle motor comprising:
   a stationary portion including a stator; and
   a rotating portion rotatably supported by the stationary portion through a lubricating oil; wherein
   the stationary portion includes a shaft arranged along a central axis extending in a vertical direction;
   the rotating portion includes:
      a sleeve portion including an inner circumferential surface arranged opposite to an outer circumferential surface of the shaft;
      a hub made of metal, and including a top plate portion extending radially outward from the sleeve portion, and an outer tubular portion extending downward from an outer edge of the top plate portion;
      a magnet made of bonded neodymium fixed to the outer tubular portion, and arranged opposite to the stator with a gap intervening therebetween; and
      a cap made of metal, and including an annular plate-shaped portion fixed to an upper surface of the top plate portion;
   the magnet has a coefficient of thermal expansion greater than a coefficient of thermal expansion of the hub; and
   the cap has a coefficient of thermal expansion greater than both the coefficients of thermal expansion of the hub and the magnet.

2. The spindle motor according to claim 1, wherein a first adhesion region in which an adhesive is located is defined between a lower surface of the plate-shaped portion and the upper surface of the top plate portion.

3. The spindle motor according to claim 2, wherein
   the stator includes a plurality of coils; and
   at least a portion of the plate-shaped portion is arranged to axially overlap with the coils.

4. The spindle motor according to claim 3, wherein a radially outer end portion of the plate-shaped portion is arranged radially outward of radially outer end portions of the coils.

5. The spindle motor according to claim 2, wherein an inside liquid surface of the adhesive is defined at a radially inner end of the first adhesion region.

6. The spindle motor according to claim 2, wherein a radial dimension of the first adhesion region is smaller than a distance from a radially outer end of the first adhesion region to a radially outer end of an upper surface of the hub.

7. The spindle motor according to claim 2, wherein
   the top plate portion includes an increased thickness portion at a radially inner portion thereof, and a decreased thickness portion extending radially outward from an outer end of the increased thickness portion;
   a second adhesion region including an outside liquid surface of the adhesive is defined radially outside the first adhesion region; and
   an outer circumferential surface of the plate-shaped portion is opposed to an inner circumferential surface of the decreased thickness portion with the second adhesion region intervening therebetween.

8. The spindle motor according to claim 2, wherein an uppermost surface of a portion of the plate-shaped portion, the portion extending over the first adhesion region, is arranged at an axial level lower than an axial level of an uppermost surface of the top plate portion.

9. The spindle motor according to claim 1, wherein the cap is made of an austenitic stainless steel.

10. The spindle motor according to claim 1, wherein the hub is made of a ferritic stainless steel.

11. The spindle motor according to claim 1, wherein
    the cap includes a projecting portion arranged to project downward from an inner edge of the plate-shaped portion; and
    an inner circumferential surface of the projecting portion is arranged radially opposite to an outer circumferential surface of the stationary portion with a gap intervening therebetween.

12. A disk drive apparatus comprising:
    the spindle motor of claim 1;
    a disk supported by the rotating portion of the spindle motor;
    an access portion configured to perform at least one of reading and writing of information from or to the disk; and
    a housing configured to accommodate the spindle motor, the disk, and the access portion.

* * * * *